(12) United States Patent
Brasseur

(10) Patent No.: US 7,621,070 B2
(45) Date of Patent: Nov. 24, 2009

(54) SNAG-RESISTANT SINKER LINE SHIELD

(76) Inventor: Bernard P. Brasseur, 168 Center Rd., Cornish, NH (US) 03745

( * ) Notice: Subject to any disclaimer, the term of this patent is extended or adjusted under 35 U.S.C. 154(b) by 81 days.

(21) Appl. No.: 11/828,414

(22) Filed: Jul. 26, 2007

(65) Prior Publication Data
US 2008/0250696 A1    Oct. 16, 2008

Related U.S. Application Data

(60) Provisional application No. 60/911,128, filed on Apr. 11, 2007.

(51) Int. Cl.
*A01K 97/00* (2006.01)
*A01K 91/03* (2006.01)

(52) U.S. Cl. .................. 43/44.97; 43/44.9; 43/43.1; 43/43.14

(58) Field of Classification Search ........... 43/44.97, 43/43.1, 44.9, 44.91, 44.87, 43.15, 42.15, 43/42.36, 42.08, 43.14
See application file for complete search history.

(56) References Cited

U.S. PATENT DOCUMENTS

| | | | | |
|---|---|---|---|---|
| 279,206 | A * | 6/1883 | Altena | 43/43.15 |
| 396,246 | A * | 1/1889 | Hofe | 43/44.83 |
| 653,020 | A * | 7/1900 | Fiers | 43/42.74 |
| 765,646 | A * | 7/1904 | Wishart | 43/43.1 |
| 1,670,185 | A * | 5/1928 | Bond | 43/44.9 |
| 2,014,517 | A * | 9/1935 | Beregow | 43/44.9 |
| 2,085,320 | A * | 6/1937 | Kolstrand | 43/42.72 |
| 2,086,457 | A * | 7/1937 | Zielesch | 43/44.97 |
| 2,117,322 | A * | 5/1938 | Hillman | 43/42.72 |
| 2,183,414 | A * | 12/1939 | Smith | 43/43.1 |
| 2,241,367 | A * | 5/1941 | Sarff | 43/43.15 |
| 2,292,517 | A * | 8/1942 | Greene | 43/44.97 |
| 2,465,064 | A * | 3/1949 | Colosimo | 43/44.83 |
| 2,476,088 | A * | 7/1949 | Gleason | 43/43.14 |
| 2,498,815 | A * | 2/1950 | McVay | 43/44.9 |
| 2,519,104 | A * | 8/1950 | Blomgren | 43/44.97 |
| 2,552,248 | A * | 5/1951 | Zavod | 43/44.83 |
| 2,577,143 | A * | 12/1951 | Midland | 43/43.15 |
| 2,591,558 | A * | 4/1952 | Kramer | 43/44.9 |

(Continued)

FOREIGN PATENT DOCUMENTS

DE        3700141 A1 *  1/1989

(Continued)

*Primary Examiner*—Darren W Ark
(74) *Attorney, Agent, or Firm*—Michael J. Weins; Jeffrey E. Semprebon

(57) ABSTRACT

A line shield has a tube that can be secured with respect to a sinker to guide the sinker over submerged obstructions. The tube has a tube passage, through which a line attached to the sinker passes, and terminates at a tube leading end and a tube trailing end. The tube is preferably secured to the sinker by a resilient hood having a hood passage sized to frictionally fit over the tube trailing end, and to frictionally fit over an eye of the sinker or a connecting element attached thereto, such as a snap. The frictional engagement of the resilient hood with the eye and the tube trailing end maintains the tube in close proximity to the sinker or connecting element. In use, the tube leading end is raised so that the tube acts as a ramp-shaped deflector to guide the sinker over obstructions.

16 Claims, 4 Drawing Sheets

U.S. PATENT DOCUMENTS

| | | | | |
|---|---|---|---|---|
| 2,625,767 A * | 1/1953 | Pokras | | 43/42.36 |
| 2,680,928 A * | 6/1954 | Silva | | 43/43.12 |
| 2,710,480 A * | 6/1955 | Gehrig | | 43/44.9 |
| 2,727,332 A * | 12/1955 | Benson | | 43/44.97 |
| 2,731,758 A * | 1/1956 | Coe | | 43/43.1 |
| 2,749,650 A * | 6/1956 | Rees | | 43/43.12 |
| 2,841,911 A * | 7/1958 | Dahlgren | | 43/43.12 |
| 2,869,278 A * | 1/1959 | Cook | | 43/42.08 |
| 2,932,115 A * | 4/1960 | Dunn | | 43/43.12 |
| 2,955,379 A * | 10/1960 | Dell | | 43/44.95 |
| 3,030,726 A * | 4/1962 | Knapton | | 43/43.15 |
| 3,041,695 A * | 7/1962 | Ouellette | | 43/44.83 |
| 3,084,471 A * | 4/1963 | Alspaugh | | 43/43.14 |
| 3,091,885 A * | 6/1963 | Ulsh | | 43/44.83 |
| 3,140,520 A * | 7/1964 | Marino et al. | | 43/43.15 |
| 3,148,423 A * | 9/1964 | Anspach | | 43/44.83 |
| 3,151,414 A * | 10/1964 | Hoerner | | 43/44.97 |
| 3,273,278 A * | 9/1966 | Lynch | | 43/44.9 |
| 3,318,037 A * | 5/1967 | Harrison et al. | | 43/44.97 |
| 3,608,229 A * | 9/1971 | Ross | | 43/43.14 |
| 3,648,398 A * | 3/1972 | Newell | | 43/44.97 |
| 3,667,151 A * | 6/1972 | Lamb | | 43/44.97 |
| 3,670,447 A * | 6/1972 | Wohead | | 43/44.97 |
| 3,672,088 A | 6/1972 | Sells | | |
| 3,744,177 A * | 7/1973 | Cron, Jr. | | 43/43.12 |
| 3,771,252 A * | 11/1973 | Odenwald | | 43/44.97 |
| 3,778,871 A * | 12/1973 | Ratte, Jr. | | 43/44.97 |
| 3,803,749 A * | 4/1974 | Boyum | | 43/44.9 |
| 3,834,061 A * | 9/1974 | Klein | | 43/44.9 |
| 3,841,013 A * | 10/1974 | Sabagonis | | 43/43.15 |
| 3,852,906 A * | 12/1974 | LaForce | | 43/44.97 |
| 3,857,645 A * | 12/1974 | Klein | | 43/44.9 |
| 3,888,036 A * | 6/1975 | Wallace | | 43/44.97 |
| 3,897,649 A * | 8/1975 | Jorgensen | | 43/43.15 |
| 3,988,852 A * | 11/1976 | Klein | | 43/44.91 |
| 4,125,958 A * | 11/1978 | Cote | | 43/43.12 |
| 4,163,337 A * | 8/1979 | Kress | | 43/42.36 |
| 4,177,598 A * | 12/1979 | Jolley | | 43/42.49 |
| 4,215,505 A * | 8/1980 | Henze et al. | | 43/44.9 |
| 4,472,903 A * | 9/1984 | Hutson | | 43/44.91 |
| 4,610,104 A * | 9/1986 | Garcia | | 43/44.9 |
| 4,615,136 A * | 10/1986 | Bank | | 43/44.91 |
| 4,633,609 A * | 1/1987 | Brown | | 43/43.1 |
| 4,644,681 A * | 2/1987 | Hutson | | 43/44.91 |
| 4,649,662 A * | 3/1987 | Tharp et al. | | 43/44.97 |
| 4,679,349 A * | 7/1987 | Birchfield | | 43/44.97 |
| 4,691,468 A * | 9/1987 | Fernbach | | 43/44.9 |
| 4,693,030 A * | 9/1987 | Wohead | | 43/43.14 |
| 4,819,364 A * | 4/1989 | Lill | | 43/43.1 |
| 4,848,018 A * | 7/1989 | Clarke | | 43/44.92 |
| 4,942,689 A * | 7/1990 | Link et al. | | 43/44.9 |
| 4,964,236 A * | 10/1990 | Adams | | 43/44.9 |
| 5,040,325 A * | 8/1991 | Herrmann | | 43/42.36 |
| 5,054,227 A * | 10/1991 | Lin | | 43/43.12 |
| 5,197,220 A * | 3/1993 | Gibbs et al. | | 43/44.9 |
| 5,233,786 A * | 8/1993 | Biss | | 43/43.14 |
| 5,274,945 A * | 1/1994 | Ross | | 43/44.91 |
| 5,461,821 A * | 10/1995 | Carter, Jr. | | 43/43.12 |
| 5,499,472 A * | 3/1996 | Krenn | | 43/44.97 |
| 5,533,296 A * | 7/1996 | Jansen | | 43/42.36 |
| 5,555,668 A | 9/1996 | Brasseur | | |
| 5,647,103 A * | 7/1997 | Foster | | 24/618 |
| 5,970,649 A * | 10/1999 | Alain et al. | | 43/43.14 |
| 6,145,240 A | 11/2000 | Adams et al. | | |
| 6,305,121 B1 | 10/2001 | Adams et al. | | |
| 6,327,808 B1 * | 12/2001 | Zascavage | | 43/44.9 |
| 6,484,435 B1 * | 11/2002 | Mosher | | 43/43.1 |
| 6,557,294 B2 | 5/2003 | Adams et al. | | |
| 6,843,018 B2 | 1/2005 | Adams et al. | | |
| 6,874,272 B1 | 4/2005 | Adams et al. | | |
| 6,910,296 B2 * | 6/2005 | Blette et al. | | 43/43.1 |
| 7,197,847 B2 * | 4/2007 | Albrant, Jr. | | 43/43.12 |
| 2002/0088166 A1 * | 7/2002 | Halsne | | 43/44.9 |
| 2003/0159332 A1 | 8/2003 | Crochet | | |
| 2003/0163945 A1 * | 9/2003 | Okada | | 43/42.36 |
| 2004/0134120 A1 | 7/2004 | Long | | |
| 2005/0022441 A1 * | 2/2005 | Blette et al. | | 43/43.1 |
| 2005/0028426 A1 * | 2/2005 | Blette et al. | | 43/43.1 |
| 2005/0039376 A1 * | 2/2005 | Blette et al. | | 43/43.1 |
| 2006/0070291 A1 * | 4/2006 | Pomeroy | | 43/44.87 |
| 2008/0086930 A1 * | 4/2008 | Swaney | | 43/43.14 |
| 2009/0133312 A1 * | 5/2009 | Bennis | | 43/43.14 |

FOREIGN PATENT DOCUMENTS

| | | | |
|---|---|---|---|
| EP | 1264542 A2 * | 12/2002 | |
| GB | 2175182 A * | 11/1986 | |
| GB | 2199471 A * | 7/1988 | |
| GB | 2200022 A * | 7/1988 | |
| GB | 2324451 A * | 10/1998 | |
| GB | 2325135 A * | 11/1998 | |
| GB | 2345425 A * | 7/2000 | |
| GB | 2354146 A * | 3/2001 | |
| JP | 04126029 A * | 4/1992 | |
| JP | 05284886 A * | 11/1993 | |
| JP | 08228651 A * | 9/1996 | |
| JP | 09233981 A * | 9/1997 | |
| JP | 11262351 A * | 9/1999 | |
| JP | 2000253788 A * | 9/2000 | |
| JP | 2004121202 A * | 4/2004 | |
| JP | 2005058001 A * | 3/2005 | |
| JP | 2005229900 A * | 9/2005 | |
| JP | 2006087320 A * | 4/2006 | |
| JP | 2006325439 A * | 12/2006 | |
| JP | 2007116943 A * | 5/2007 | |
| JP | 2007135556 A * | 6/2007 | |
| JP | 2007189967 A * | 8/2007 | |
| JP | 2007209313 A * | 8/2007 | |
| JP | 2007222147 A * | 9/2007 | |
| JP | 2007330165 A * | 12/2007 | |
| JP | 2008017720 A * | 1/2008 | |
| JP | 2008188005 A * | 8/2008 | |
| JP | 2008271936 A * | 11/2008 | |
| WO | WO 2004071187 A1 * | 8/2004 | |

* cited by examiner

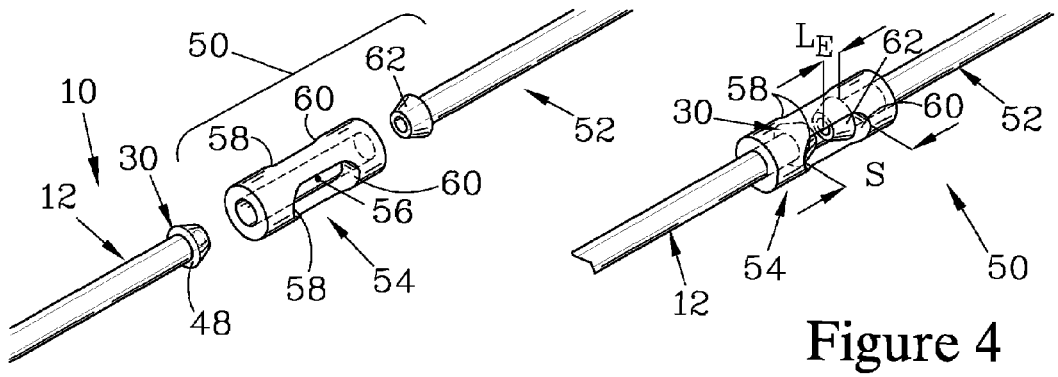
Figure 3
Figure 4
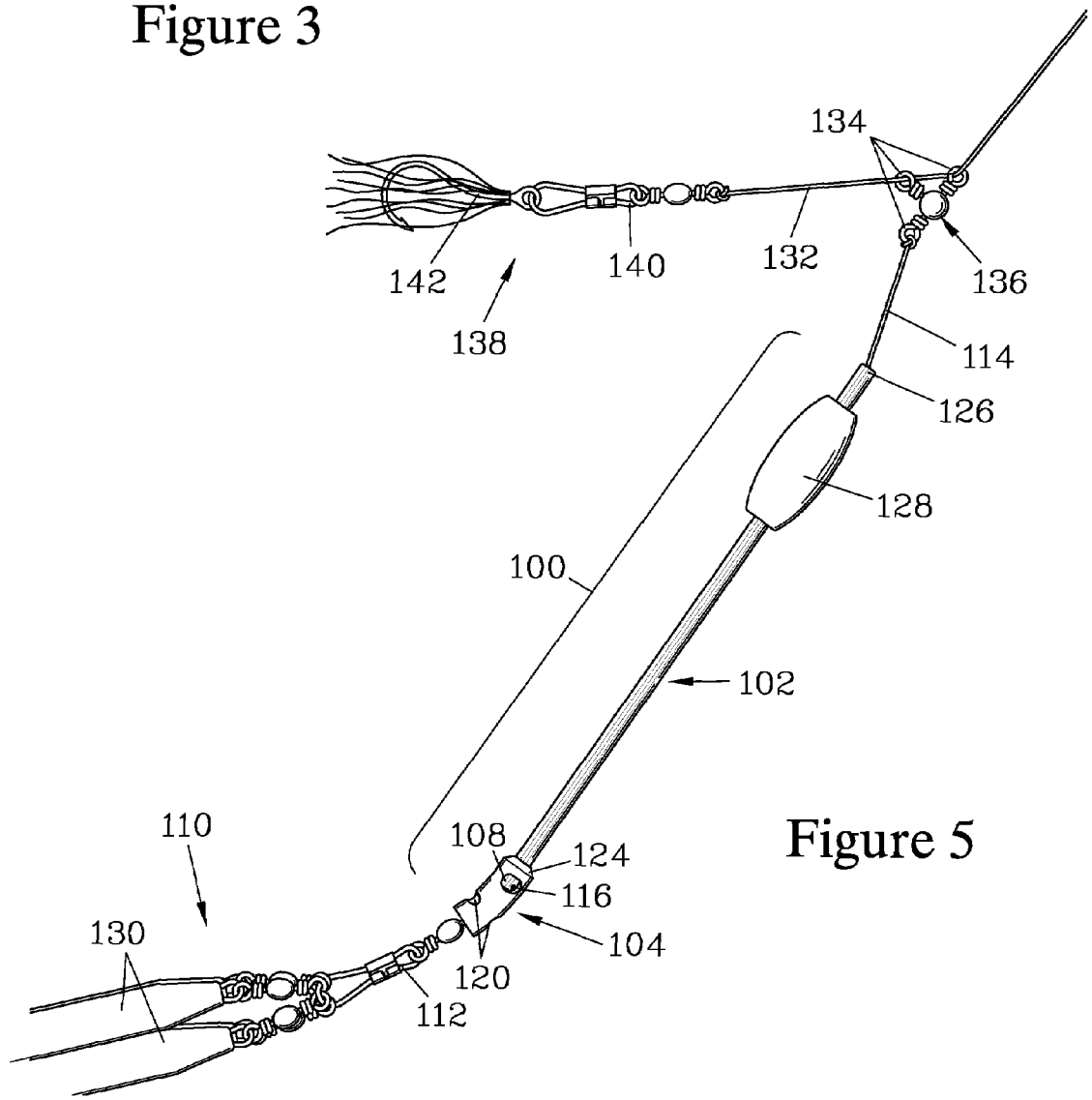
Figure 5

SNAG-RESISTANT SINKER LINE SHIELD

FIELD OF THE INVENTION

The present invention relates to sinker systems employed to hold a fishing line near the bottom of a body of water, and more particularly to a line shield which can be employed with sinkers to greatly reduce the tendency of the sinkers to snag or become entangled by obstructions or weeds.

BACKGROUND OF THE INVENTION

To catch fish by angling, a number of fishing tackle elements are employed such as hooks, lures, sinkers, etc. These tackle elements are attached to a fishing line and, when used in close proximity to the bottom of a body of water, these elements have been found prone to snagging on weeds, rocks, submerged branches, and similar obstacles. This snagging frequently results in breakage of the fishing line and loss of the tackle elements attached thereto. Breakage of the line due to snagging also requires the user to attach new tackle, taking time away from actively fishing.

U.S. Pat. No. 5,555,668 of the present inventor teaches a bait locating device which overcomes the problem of snagging hooks and lures. The '668 bait locating device employs a flotation member which engages a fishing line to float the line off the bottom while allowing the fishing line to pass freely through when the lure or bait is taken by a fish. The flotation member of the '668 patent is connected to a sinker by a sinker line. The sinker holds the flotation member near the bottom, at a depth determined by the length of the sinker line; by adjusting the sinker line length, the lure or bait can be maintained a desired height above the bottom. Since the lure or bait is raised off the bottom, it can pass over most obstructions. The sinker which rests on the bottom may still become snagged on obstruction; however, when the sinker line is selected to be weaker than the fishing line that attaches to the lure, then the sinker line can be broken if the sinker becomes snagged, and the lure can then be recovered.

U.S. Pat. No. 6,484,435 teaches an alternative device to maintain a fishing line and lure at a constant height above the bottom. An elongated, flexible buoyant member serves to attach a sinker to the fishing line, where the buoyancy is intended to lift the fishing line to the desired height over the bottom to avoid snagging of the lure. If the sinker becomes snagged, the buoyant member can break apart to allow recovery of the lure. The '435 device lacks the ability to adjust the height of the lure in the manner provided by the '668 bait locating device. Furthermore, when the buoyant member is designed to break apart, it may be susceptible to damage by abrasion. The '435 device also lacks any structure to avoid tangling of the hook with the sinker and/or buoyant member when casting, as is provided by the structure of the '668 bait locating device.

While the above devices address the problem of snagging and loss of lures and hooks, they do not overcome the problem of sinkers becoming snagged. To reduce the likelihood of snagging, attempts have been made to provide sinkers that are less prone to becoming snagged on obstructions in the water.

U.S. Pat. Nos. 6,145,240; 6,305,121; 6,557,294; 6,843,018; and 6,874,272, teach sinkers having a curved, elongated body with a buoyant portion and a weighted portion. The buoyant portion is intended to provide a degree of lift to the sinker and, in combination with the curved body, is intended to allow the sinker to slide over and/or past obstructions rather than snagging. However, the reduction in overall effective weight due to the buoyant portion and the tendency to stand upright when the sinker line is tensioned may limit the useful applications of the sinker. The limitations of these sinkers are discussed in the Background section of U.S. Publication 2003/0159332, which teaches an elongated sinker having a section that is inclined to the remainder and without any buoyant portion. The inclined portion of this sinker is intended to cause the sinker to provide a twisting motion upon contact with obstacles to prevent snagging. However, the weight may still be prone to snagging in situations where there is insufficient space to accommodate the twisting motion, and may be prone to entanglement in weeds.

U.S. Pat. Nos. 3,670,447 and 3,672,088 teach other elongated sinkers having buoyant portions, where the buoyant portion is intended to maintain the sinker in an upright position in the water to allow it to pass over obstructions without snagging, as well as to lift a fishing lure off the bottom in a manner similar to the '435 patent discussed above. Again, the use of a buoyant portion will tend to reduce the overall effectiveness of the sinker. Additionally, the buoyancy of these elongated sinkers would not appear to be sufficient to allow the sinkers to maintain their upright position when exposed to sideways forces, and thus they may not be able to maintain the lure at a desired height over the bottom when trolling and/or when used in areas with a strong current. The upright position of these sinkers may increase the likelihood of the sinker falling into crevices and becoming snagged therein. To prevent falling into crevices, U.S. Pat. No. 4,693,030, by the same inventor as the '447 patent, teaches the addition of wire legs onto this basic sinker structure to reduce the likelihood of the sinker becoming jammed in crevices or rocks. While the wire legs of the '030 patent may provide a benefit in rocky environments, they would appear to increase the risk of snagging when employed in areas with weeds and/or branches, and may increase the risk of entanglement with the lure or bait when casting.

U.S. Publication 2004/0134120 teaches another sinker intended to reduce snagging when used in rocky environments. This sinker has a streamlined body with an inclined passage for the fishing line, where the inclination of the passage is intended to lift the sinker as it is retrieved, allowing it to lift over rocks. Again, the sinker may be prone to snagging when used in areas with weeds and/or branches.

SUMMARY OF THE INVENTION

The present invention provides a line shield for use with a sinker line which is attached to a sinker. The sinker serves to maintain a fishing lure or bait in the vicinity of the bottom of a body of water, and the line shield complements the sinker and acts as a deflector to help guide the sinker over any submerged obstructions. The line shield also prevents chafing of the sinker line as it is drawn past and over submerged objects. The line shield is well suited for use with a bait locating device such as taught in U.S. Pat. No. 5,555,668, but can provide advantages when used in other fishing situations as well.

The line shield has a resilient tube with a tube passage therethrough, through which the sinker line can freely pass, and terminates a tube leading end and a tube trailing end. The terms "leading", "trailing", "forward", and "rearward" are defined with regard to the direction in which the elements are moved when the sinker line is pulled through water, either to troll or to retrieve the lure or bait and the sinker that are connected to the sinker line. Thus, the tube leading end is the end which is closest to the angler, and thus is forward when the sinker line is moved through the water by tension applied by the angler. The tension on the sinker line typically causes the tube leading end to be raised further from the bottom than the tube trailing end when the line shield is in service. The tube trailing end is the end closest to the sinker, and thus is typically closer to the bottom when the line shield is in service. The tube trailing end is further from the angler in service, and thus is rearward when the sinker line is moved through the water by tension applied by the angler.

To allow the resilient tube to act as a deflector for the sinker, the line shield has means for securing the tube with respect to the sinker. Frequently, the sinker line is tied to an eye associated with the sinker, either an eye provided directly on the sinker or an eye on a connecting element such as a snap which in turn attaches to the sinker. In such cases, means for securing the tube with respect to the sinker are preferably provided by a hood of resilient material having a hood passage therethrough, where the hood passage is configured to frictionally engage the eye and the tube trailing end, when the tube trailing end is inserted into the hood passage. The tube trailing end can be enlarged to provide a more positive engagement with the hood passage.

The resilient hood serves to maintain the tube in close proximity to the sinker or the connecting element; thus, when the tube leading end is raised by a float or by tension on the sinker line, the tube acts as a ramp-shaped deflector to help guide the sinker over obstructions.

The hood passage is sized to fit over and frictionally engage the tube trailing end. For use with a variety of sinkers having an associated eye, the hood passage is also sized to fit over and substantially cover the eye of the sinker or the eye of a connecting element attached to the sinker, to which the sinker line is tied. Alternatively, the resilient hood can be formed by a resilient hood that is a part of the sinker; one such hood, which frictionally attaches to a weight of the sinker, is taught in copending application Ser. No. 11/828,417 of the present inventor entitled "Snag-Resistant Linkable Sinker".

Preferably, the tube has a length of at least about three inches. The tube is preferably formed from a slightly flexible material, allowing it to provide a bouncing effect to the sinker to further reduce snagging. It is also preferred for the tube to be formed of a transparent or translucent material such as plastic to reduce its visibility when submerged.

The tube trailing end is preferably enlarged so as to form a trailing end ledge, facing toward the tube leading end, and a tapered guide surface, facing away from the tube leading end. When the tube trailing end is formed with a trailing end ledge, the hood passage forcibly engages the trailing end ledge to maintain the resilient hood engaged with the tube, while the tapered guide surface facilitates insertion of the tube trailing end into the hood passage.

The resilient hood preferably has at least one cutout that communicates with the hood passage, which aids in providing a more positive engagement of the trailing end ledge of the tube. Preferably, the at least one cutout is so configured as to also positively engage the eye of the sinker or connector element. In another embodiment, at least one pair of opposed cutouts is provided. Preferably, the resilient hood has a hood leading end that is tapered to further resist snagging.

It is preferred for the tube leading end to be enlarged, and more preferably it is formed as a mirror image to the tube trailing end to allow connection to a second line shield. In such cases, an additional tube can be connected to a first by inserting the tube leading end of the first tube into a second resilient hood attached to the tube trailing end of the second tube, in order to provide an articulated deflector of increased length. To accommodate the enlarged leading end of the first tube in addition to the tube trailing end of the second tube, the second resilient hood of the second line shield should have a length sufficient that the hood passage will allow the respective ends of both tubes to be frictionally engaged therein.

BRIEF DESCRIPTION OF THE FIGURES

FIG. 3 is an exploded partial isometric view showing the tube leading end of the embodiment shown in FIGS. 1 and 2 employed with a second line shield having a second resilient hood in which the tube leading end of the second line shield can be inserted and frictionally engaged to connect the tube of the first line shield to the tube of the second.

FIG. 4 is a partial view showing the tube leading end of the first line shield inserted into the second resilient hood shown in FIG. 3. When so inserted, the second resilient hood connects the two tubes together to provide an articulated line shield of increased length.

FIG. 5 is a schematic illustration of a line shield that forms another embodiment of the present invention which employs a resilient hood. The resilient hood of this line shield has two pairs of opposed cutouts, as better shown in FIG. 6. A leading pair of cutouts provides hood rearward-facing ledges to positively engage a trailing end ledge of a tube, while a trailing pair of cutouts positively engages an eye of a snap swivel associated with a sinker. This resilient hood also has a hood leading end that is tapered. The line shield is shown in FIG. 5 employed with a tube float that is attached to the tube near the tube leading end. The tube leading end of this embodiment is not enlarged, so as to facilitate slipping the tube float onto the tube. As shown, the tube passes over a sinker line which is attached between a 3-way swivel and a bundled sinker, while a line attached to a lure passes through the 3-way swivel.

DETAILED DESCRIPTION OF THE PREFERRED EMBODIMENTS

Figures 1, 2:
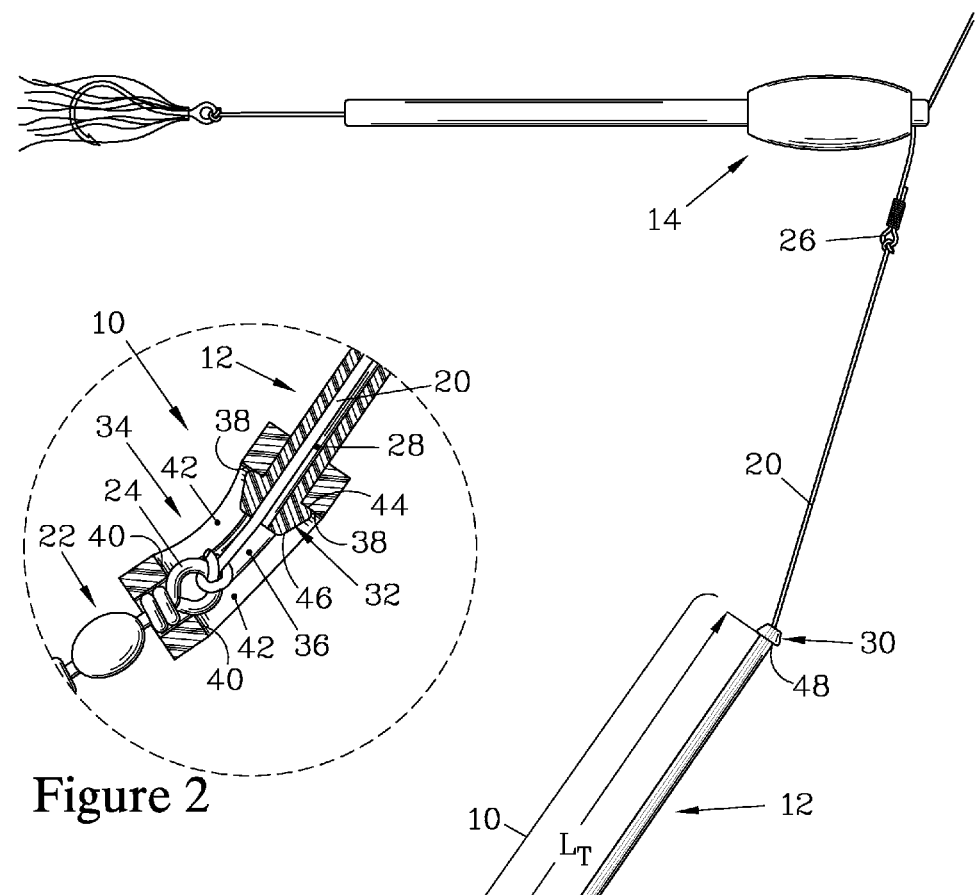
FIG. 1 is a schematic view showing one embodiment of a line shield of the present invention in use. The line shield as shown in FIG. 1 is being used in combination with a sinker having an eye which is attached to a sinker line of a bait locating device; the sinker line is tied to a conventional snap swivel having a snap eye, which in turn attaches to the sinker. The line shield has a tube and a resilient hood that is formed of a resilient material that frictionally engages both the snap eye and the tube to maintain the sinker and the line shield together and to allow the tube to guide the sinker over obstructions.
FIG. 2 is a partial section view showing the resilient hood and a tube trailing end of the tube of the embodiment shown in FIG. 1. The resilient hood of this embodiment has a pair of opposed cutouts that communicate with a hood passage to provide hood rearward-facing ledges to positively engage the tube trailing end of the tube, and hood forward-facing ledges to positively engage the snap eye of the snap swivel. The tube trailing end is enlarged, being formed with a trailing end ledge that faces forward toward a tube leading end, and with a tapered guide surface to facilitate inserting the tube trailing end into the hood passage of the resilient hood. The trailing end ledge of the tube positively engages the hood rearward-facing ledges.

The present invention provides a line shield for a sinker line that attaches to a sinker, the line shield helping to prevent snagging of the sinker on underwater obstructions. FIGS. 1-2 illustrate one embodiment of the present invention, a line shield 10 having a resilient tube 12. FIG. 1 shows the line shield 10 when employed with a bait locating device 14, such as that taught in U.S. Pat. No. 5,555,668, incorporated herein by reference, and a sinker 16. The sinker 16 illustrated in FIG. 1 is a linkable sinker discussed in copending application Ser. No. 11/828,417 of the present inventor entitled "Snag-Resistant Linkable Sinker". The line shield 10 acts as a deflector to guide the sinker 16 and any associated connector elements over obstructions such as rocks, weeds, or branches, such as a branch 18 also shown in FIG. 1. The sinker 16 is shown attached to a sinker line 20 by a snap swivel 22 having a swivel eye 24 to which the sinker line 20 is tied. The sinker line 20 in turn ties onto an adjustable eye 26 on the bait locating device 14.

The tube 12 has a tube passage 28 therethrough, as shown in FIG. 2. The tube passage 28 is sized such that the sinker line 20 can freely pass therethrough. The tube 12 has a tube leading end 30 and a tube trailing end 32.

Means for securing the tube trailing end 32 with respect to the sinker 16 are provided. In this embodiment, these means are provided by a resilient hood 34 formed from a resilient material and having a hood passage 36 therethrough. As shown in FIG. 2, the hood passage 36 is sized to fit over the tube trailing end 32 and over the swivel eye 24 that is connected to the sinker 16.

The tube trailing end 32 is enlarged in this embodiment so as to have a greater diameter than the remainder of the tube 12, and the hood passage 36 is configured such that the tube trailing end 32 becomes frictionally engaged in the hood passage 36 when inserted therein. Similarly, the hood passage 36 is configured to frictionally engage the swivel eye 24 to secure the tube 12 to the swivel eye 24, allowing the line shield 10 to lift the snap swivel 22 and the sinker 16 attached thereto over obstructions such as the branch 18 shown in FIG. 1.

The resilient hood 34 also covers the joint between the tube 12 and the snap swivel 22, to reduce the likelihood of entanglement with weeds, and covers the sinker line 20 where it attaches to the swivel eye 24 to prevent chafing. The resilient character of the resilient hood 34 allows it to accept and frictionally engage the tube trailing end 32 and the swivel eye 24, and allows it to bounce off obstructions that it contacts.

While the resilient hood 34 is shown connecting the tube 12 to the swivel eye 24 of the snap swivel 22, which in turn attaches to the sinker 16, it should be appreciated that the resilient hood 34 could connect directly to the sinker 16 without the use of the snap swivel 22 if the sinker 16 has an eye of the appropriate size or is otherwise configured to be retainably engaged by the resilient hood 34. Examples of line shields employed where a sinker line connects directly to an eye on a sinker are discussed below with respect to FIGS. 10 and 11.

The tube 12 is formed from a slightly flexible resilient material, such as a moderately stiff plastic. It is preferred for the tube 12 to be formed of a transparent or translucent material so that, when submerged, the tube 12 will not be readily visible. One material which has been found effective is polypropylene tubing. Polypropylene tubing having an inside diameter of about 1/32" and an outside diameter of about 3/32" has been found to provide a desired degree of resiliency and resistance to kinking. The tube leading end 30 and the tube trailing end 32 are separated by a tube length $L_T$, which preferably measures at least about three inches. It has been found effective to employ tube lengths of about six inches to twelve inches; a tube length $L_T$ of about six inches has been found effective for use in streams and rivers, and a tube length $L_T$ of about twelve inches has been found effective for trolling, for saltwater use, or for use in areas with large rocks. When a length longer than twelve inches is desired, two or more line shields can be connected together, as discussed below with regard to FIG. 3. Connecting two or more line shields together allows the effect of a longer line shield while maintaining the lengths of the individual elements small enough so that they can be readily stored in a tackle box.

Preferably, the resilient hood 34 has at least one hood rearward-facing ledge 38 configured to positively engage the enlarged tube trailing end 32 of the tube 12; the hood rearward-facing ledge 38 faces away from the tube leading end 30 and, in service, faces toward the sinker 16. It is also preferred for the hood passage 36 to have at least one forward-facing ledge 40 that faces toward the tube 12 when in service, and which is configured to positively engage the swivel eye 24. In the resilient hood 34, two hood rearward-facing ledges 38 and two hood forward-facing ledges 40 are provided by a pair of opposed cutouts 42, which are sufficiently deep as to communicate with the hood passage 36. Employing one or more cutouts to provide the ledges allows the resilient hood 34 to be readily formed from resilient tubing stock. One material that has been found effective in providing a desired degree of resiliency while remaining durable in use is natural or synthetic rubber tubing. One type of material which has been found suitable is the tubing employed in vehicles to carry windshield washer fluid from a reservoir to a spray nozzle. When the tube 12 is formed of tube stock having the dimensions set forth above, it has been found effective to employ tubing having an inside diameter of about 3/32" and an outside diameter of about 1/4" when in an unstretched condition.

To help retain the tube trailing end 32 engaged with the hood rearward-facing ledges 38, the enlarged tube trailing end 32 is preferably configured with a trailing end ledge 44 that faces toward the tube leading end 30. To facilitate insertion of the tube trailing end 32 into the hood passage 36, the tube trailing end 32 can be provided with a tapered guide surface 46. When polypropylene tubing is employed for the tube 12, it has been found that the enlarged tube trailing end 32 can be formed by applying heat to the tube trailing end 32, which causes the polypropylene material to naturally deform so as to form a suitable shape for the tube trailing end 32.

To allow the line shield 10 to guide the sinker 16 attached thereto over obstructions, the tube 12 should be maintained in an inclined position with the tube leading end 30 raised. When the sinker 16 is elongated, the resilient hood 34 should provide sufficient flexibility to allow the sinker 16 to rest on the bottom while the tube 12 is inclined. As shown in FIG. 1, the tube leading end 30 can be lifted by the sinker line 20, when the sinker line 20 is in turn attached to the bait locating device 14 or other float, or is otherwise lifted by connection to a fishing line leading to the water surface. The tube trailing end 32 is held down toward the bottom by the weight of the sinker 16, to which the resilient hood 34 is connected via the snap swivel 22. In this inclined position, the tube 12 forms a ramp surface for contacting obstructions such as the branch 18, this ramp causing the tube 12 to slide over the obstruction and lift the sinker 16 such that the sinker 16 also slides over the obstruction, rather than becoming snagged thereon.

When it is desirable to couple one or more additional tubes in series with the tube 12, it is preferred for the tube 12 to have the tube leading end 30 enlarged, so as to have a configuration that is essentially a mirror image of the tube trailing end 32 and to be provided with a leading end ledge 48. When so formed, the tube leading end 30 can be securely connected to a second line shield 50, shown in FIGS. 3 and 4, to provide the effect of a longer line shield. The second line shield 50 has a second tube 52 and a second resilient hood 54, having a second hood passage 56. When the tube leading end 30 is inserted into the second hood passage 56 as shown in FIG. 4, two hood forward-facing ledges 58 on the second resilient hood 54 serve to positively engage the leading end ledge 48 to retain the tube leading end 30 in the second hood passage 56. The engagement of the tube leading end 30 with the second resilient hood 54 allows the user to link the two line shields (10, 50) together to provide an articulated line shield of greater length. When disconnected, the individual line shields (10, 50) will each be short enough so as to be readily stored in a tackle box.

The hood forward-facing ledges 58 of the second resilient hood 54 are separated from a pair of hood rearward-facing ledges 60 by a sufficient distance to accommodate insertion of both the tube leading end 30 and a second tube trailing end 62 of the second tube 52 into the second hood passage 56 a sufficient distance for each to become securely engaged therein. When the tube leading end 30 and the second tube trailing end 62 each have a tube end length $L_E$, then the hood rearward-facing ledges 60 should be longitudinally spaced apart from the hood forward-facing ledges 58 by a separation S which is greater than twice the tube end length $L_E$ ($S>2L_E$).

Figure 6:
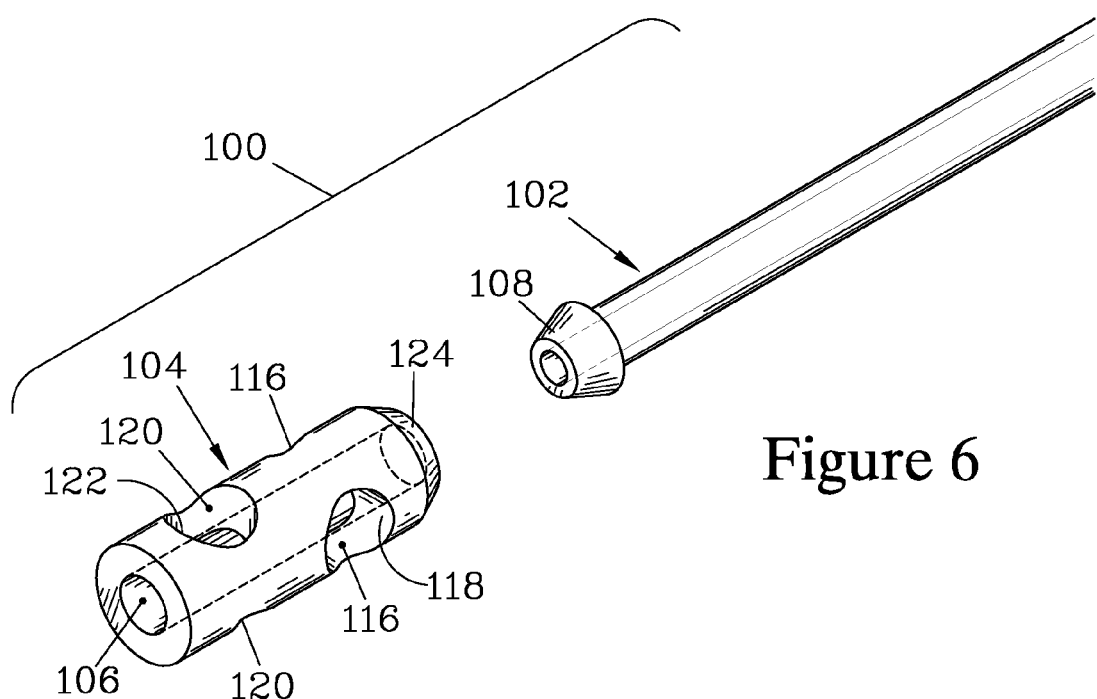
FIG. 6 is an exploded partial isometric view of the line shield shown in FIG. 5, better illustrating the structure of the resilient hood.

FIGS. 5 and 6 illustrate another embodiment of the present invention, a line shield 100. Again, the line shield 100 has a tube 102 and a resilient hood 104 having a hood passage 106 (shown in FIG. 6) into which a tube trailing end 108 of the tube 102 is inserted; when so inserted, the tube trailing end 108 becomes frictionally engaged to provide means for securing the tube trailing end 108 with respect to a sinker 110 having an associated eye (not shown) which is also frictionally engaged in the hood passage 106; in this embodiment, the eye is provided on a snap swivel 112 which attaches to the sinker 110 and to which a sinker line 114 is tied. The resilient hood 104 differs from the resilient hoods (34, 54) discussed above in that it has two pairs of opposed cutouts that communicate with the hood passage 106, as better shown in FIG. 6. A leading pair of cutouts 116 provide hood rearward-facing ledges 118, while a trailing pair of cutouts 120 provide forward-facing ledges 122. The resilient hood 104 also differs in having a hood leading end 124 that is tapered to resist catching on weeds or obstructions.

As pointed out above when discussing the line shield 10, the tube 102 should be maintained in an inclined position so as to provide a ramp surface for guiding the sinker 110 secured thereto over obstructions. FIG. 5 illustrates an alternative approach to lifting a tube leading end 126 of the tube 102 so as to maintain the desired inclination of the tube 102. In the embodiment shown in FIG. 5, the line shield 100 is employed without a float directly attached to the sinker line 114. In this embodiment, a tube float 128 is attached directly to the tube 102 in the vicinity of the tube leading end 126 to lift the tube leading end 126, while the tube trailing end 108 is held down toward the bottom by the weight of the sinker 110, to which the tube trailing end 108 is connected by the resilient hood 104 and the snap swivel 112. The snap swivel 112 is tied to the sinker line 114, which passes through the resilient hood 104 and the tube 102. The sinker 110 illustrated in FIG. 5 is a modular sinker that is formed from a number of stackable weights 130, such modular sinkers being discussed further in the present inventor's copending application Ser. No. 11/828,421 entitled "Stackable Casting Sinker". It should be appreciated that other sinkers could be employed, such as the linkable sinker 16 shown in FIG. 1.

The tube leading end 126 of this embodiment is not enlarged, to allow the tube float 128 to be readily attached or removed from the tube 102. When the tube float 128 is employed, FIG. 5 shows one preferred scheme for attaching the sinker line 114 to a fishing line 132. In this arrangement, the fishing line 132 passes through two eyes 134 of a three-way swivel 136 before attaching to terminal fishing tackle 138, which is shown as including a snap swivel 140 and a lure 142. The sinker line 114 is attached to the third eye 134 of the three-way swivel 136. When a fish takes the lure 142, the fishing line 132 can pass freely through the eyes 134 of the three-way swivel 136 to prevent the fish from feeling the resistance of the line shield 100 and the sinker 110 that are attached to the sinker line 114.

Figure 7:
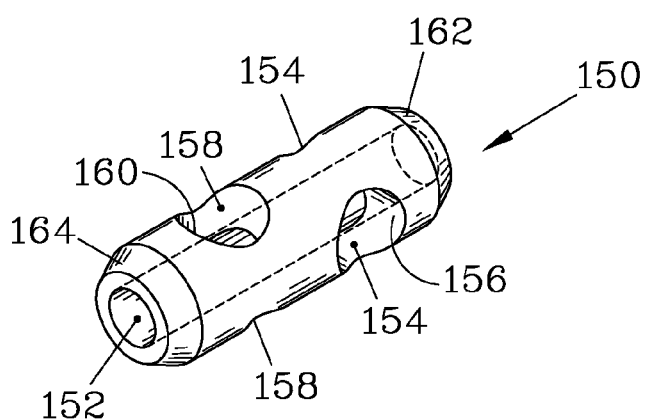
FIG. 7 is an isometric view of another resilient hood that could be employed with a tube to form a line shield of the present invention. The resilient hood shown in FIG. 7 is similar to that shown in FIG. 6, but is tapered on both a hood leading end and a hood trailing end. The symmetrical form of this resilient hood allows it to be attached onto a tube without requiring the resilient hood to first be properly oriented, and thus facilitates assembly of the resulting line shield.

FIG. 7 illustrates a resilient hood 150 which can be employed in place of the resilient hood 104 to provide means for securing a tube trailing end of a tube, such as the tubes (12, 52, 102) discussed above, with respect to a sinker. The resilient hood 150 has many features in common with the resilient hood 104 discussed above, having a hood passage 152, a leading pair of cutouts 154 that provide a pair of hood rearward-facing ledges 156, a trailing pair of cutouts 158 that provide a pair of forward-facing ledges 160, and a hood leading end 162 that is tapered to resist catching on weeds or obstructions. The resilient hood 150 shown in FIG. 7 also has a hood trailing end 164 that is tapered, forming a mirror image to the hood leading end 162. Since the resilient hood 150 is symmetrical, a user can attach it to a tube in either orientation, facilitating assembly of the resulting line shield.

Figure 8:
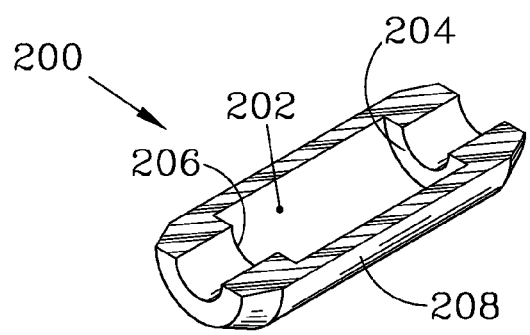
FIG. 8 is an isometric sectioned view showing another resilient hood that could be employed. In this embodiment, internal ledges are formed in a hood passage of the resilient hood so as to provide a smooth exterior for the resilient hood.

FIG. 8 illustrates a resilient hood 200, which can again be employed with a tube such as the tubes (12, 52, 102) discussed above. The resilient hood 200 has a hood passage 202 that is formed with a hood rearward-facing ledge 204 and a hood forward-facing ledge 206. The hood rearward-facing ledge 204 and the hood forward-facing ledge 206 of this embodiment are internal to the resilient hood 200, providing a smooth exterior surface 208 for the resilient hood 200. However, this smooth exterior surface 208 is obtained at the expense of increased difficulty in fabricating the resilient hood 200.

Figure 9:
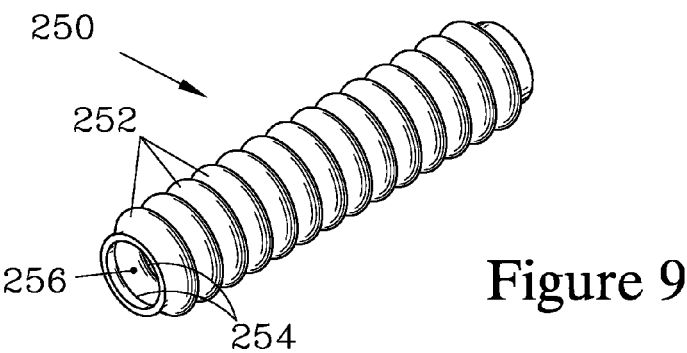
FIG. 9 is an isometric view of another resilient hood which is formed from a length of corrugated tubing. The corrugations serve to provide ledges in a hood passage.

FIG. 9 illustrates another resilient hood for use with a tube such as the tubes (12, 52, 102) discussed above, a resilient hood 250. The resilient hood 250 is formed from a length of tubular material having corrugations 252. The corrugations 252 form a series of internal ledges 254 in a hood passage 256, which can serve as hood rearward-facing ledges and hood forward-facing ledges.

Figure 10:
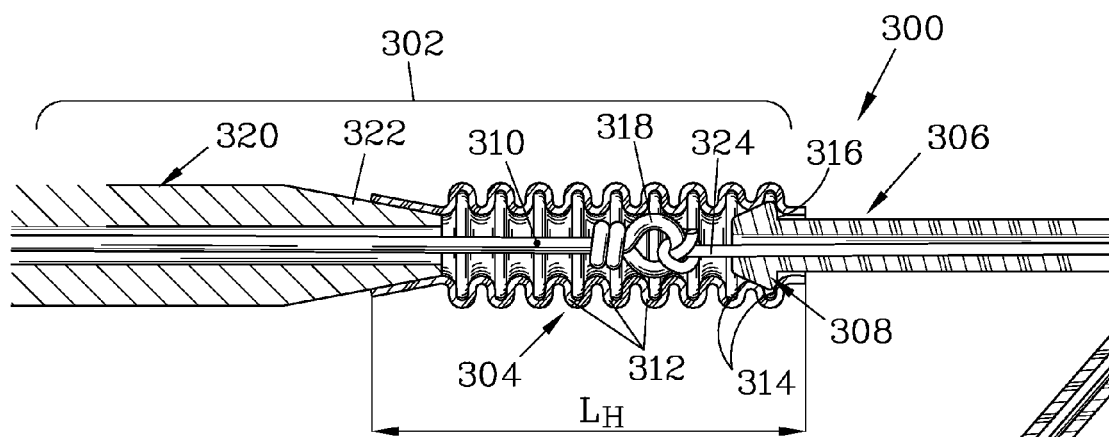
FIG. 10 is a partial section view of a line shield formed by a tube having an enlarged tube trailing end that can frictionally engage a hood passage of a resilient hood. The resilient hood of this embodiment is part of a linkable sinker having an eye to which a sinker line is tied. In the embodiment shown, the resilient hood of the linkable sinker is formed from a length of corrugated tubing similar to that employed for the resilient hood shown in FIG. 9, but which has sufficient length to both frictionally attach to a weight of the linkable sinker and to cover a protruding eye of the sinker. The corrugations provide the hood passage with a series of internal ledges, which serve as rearward-facing ledges to retain the tube trailing end.

FIG. 10 is a section view that illustrates another embodiment of the present invention, a line shield 300 for use in combination with a sinker 302 having a resilient hood 304; the sinker 302 shown is a linkable sinker discussed in copending application Ser. No. 11/828,417 of the present inventor entitled "Snag-Resistant Linkable Sinker". The line shield 300 has a tube 306 terminating in a tube leading end (not shown) and a tube trailing end 308.

The resilient hood 304 of the sinker 302 has a hood passage 310, and the tube trailing end 308 is configured to frictionally engage the hood passage 310 when inserted therein, allowing the resilient hood 304 to provide means for securing the tube trailing end 308 with respect to the sinker 302. In the sinker 302 illustrated, the resilient hood 304 is formed from a length of corrugated tubing, similar to that employed for the resilient hood 250 discussed above. Again, the corrugated tubing has corrugations 312 that provide the hood passage 310 with a series of rearward-facing ledges 314. The rearward-facing ledges 314 are positioned to be engaged by a trailing end ledge 316 on the tube trailing end 308 to positively engage the tube trailing end 308 in the hood passage 310.

The sinker 302 has an eye 318 which extends from a weight 320. The resilient hood 304 has a hood length $L_H$ sufficient that the resilient hood 304 can engage the weight 320 while still extending sufficiently to cover the eye 318, which resides in the hood passage 310. The resilient hood 304 is preferably frictionally secured to a tapered weight leading end 322 of the weight 320, the weight leading end 322 being forcibly inserted into the hood passage 310.

Figure 11:
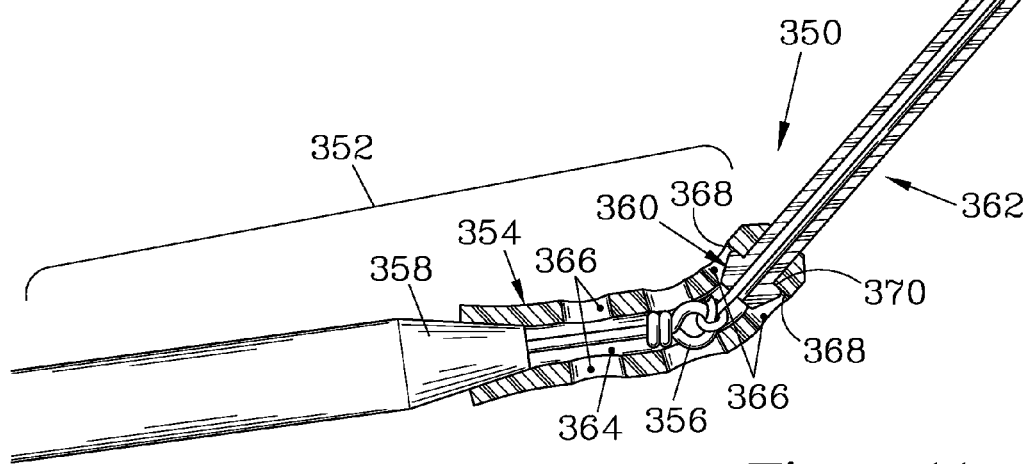
FIG. 11 is a partial section view showing another resilient hood of a sinker that can be securably engaged by a tube to form a line shield. In this embodiment, the tube has a tube trailing end that frictionally engages a hood passage of the resilient hood which, in this embodiment, has a series of cutouts. A leading pair of cutouts provide a pair of hood rearward-facing ledges for positively engaging a trailing end ledge on the tube trailing end.

FIG. 11 is a partial section view showing a line shield 350 employed with a different sinker 352; again, the sinker 352 is a linkable sinker having a resilient hood 354 covering an eye 356 and frictionally engaging a tapered weight leading end 358. The resilient hood 354 also serves to secure a tube trailing end 360 of a tube 362. In the sinker 352, the resilient hood 354 is formed from a length of resilient tubing, having a hood passage 364 in which the eye 356 resides. The resilient hood 354 is also provided with a series of opposed cutouts 366 that provide the resilient hood 354 with increased compressibility.

The cutouts 366 communicate with the hood passage 364 to provide the resilient hood 354 with a pair of rearward-facing ledges 368 that are configured to be positively engaged by a trailing end ledge 370 of the tube trailing end 360 when the tube trailing end 360 is inserted into the hood passage 364. The engagement of the tube trailing end 360 with the resilient hood 354 provides the line shield 350 with means for securing the tube trailing end 360 with respect to the sinker 352.

When a linkable sinker such as taught in the copending application Ser. No. 11/828,417 of the present inventor entitled "Snag-Resistant Linkable Sinker" is employed with the line shield 350 in the manner shown in FIG. 11, the resulting combination has been found particularly effective when employed with a bait locating device, such as that taught in U.S. Pat. No. 5,555,668. In some cases when the combination of the linkable sinker 352 and the line shield 350 have been employed with a bait locating device which raises lures above the bottom of the water, several lures have been lost due to snagging, but no sinkers were snagged while being dragged directly over the bottom of the body of water.

While the novel features of the present invention have been described in terms of particular embodiments and preferred applications, it should be appreciated by one skilled in the art that substitution of materials and modification of details obviously can be made without departing from the spirit of the invention.

What I claim is:

1. A line shield for a sinker line that attaches to a sinker, the line shield comprising:
  a resilient tube having a tube passage through which the sinker line can freely pass, said tube terminating in a tube leading end and a tube trailing end, said tube trailing end being enlarged, said tube trailing end further comprising:
    a trailing end ledge facing toward said tube leading end; and
  means for securing said tube trailing end with respect to the sinker,
    said means for securing said tube trailing end with respect to the sinker further comprising a hood of resilient material having a hood passage therethrough which is configured to frictionally connect to the sinker, said hood further comprises:
      at least one rearward-facing ledge formed by at least one cutout in said hood, said at least one cutout extending through the hood transverse to a longitudinal axis of said hood, said at least one cutout communicating with said hood passage at an inner end thereof and with an exterior of said hood at an exterior end thereof, said at least one cutout being positively engaged by said trailing end ledge of said tube when said tube trailing end is inserted into said hood passage and said trailing end ledge extends into said at least one cutout and engages said at least one rearward-facing ledge; and
    said tube trailing end further comprises a tapered guide portion that facilitates insertion of said tube trailing end into said hood,
      the frictional connection of said hood passage to the sinker and the frictional engagement of said hood passage with said tube trailing end serving to secure said tube trailing end with respect to the sinker so as to flexibly maintain said tube trailing end in close proximity to the sinker to allow said tube to guide the sinker over obstructions.

2. The line shield of claim 1 for use when the sinker line is tied to an eye associated with the sinker,
  wherein said hood passage is sized to fit over and become frictionally engaged with the eye associated with the sinker.

3. The line shield of claim 2 wherein said hood further comprises:
  at least one forward-facing ledge communicating with said hood passage and configured to frictionally engage the eye associated with the sinker.

4. The line shield of claim 3 wherein said at least one forward-facing ledge is formed by said at least one cutout in said hood.

5. The line shield of claim 4 wherein said tube further comprises:

an enlarged tube leading end sized so as to be insertable into said hood passage and to become frictionally engaged therewith, said tube leading end having a leading end ledge facing toward said tube trailing end and a leading end tapered guide portion, said tube leading end and said tube trailing end each having a tube end length $L_E$ measured, respectively, from said leading end ledge and from said trailing end ledge, and said at least one rearward-facing ledge and said at least one forward-facing ledge of said hood being longitudinally spaced apart by a separation S selected such that $S>2L_E$.

6. The line shield of claim 5 wherein said at least one cutout further comprises:

a leading pair of cutouts which provide said at least one rearward-facing ledge; and a trailing pair of cutouts which provide said at least one forward-facing ledge.

7. The line shield of claim 2 wherein said hood further comprises:

a hood leading end which is tapered.

8. The line shield of claim 7 wherein said hood further comprises:

a hood trailing end which is tapered.

9. The line shield of claim 1 for use when the sinker has a weight with a tapered weight leading end, wherein said hood passage is configured to frictionally accept the tapered weight leading end of the sinker.

10. The line shield of claim 1 wherein said tube has a tube length $L_T$ of at least about three inches.

11. The line shield of claim 10 wherein said tube is formed from a group of materials comprising:

transparent and translucent materials.

12. The line shield of claim 11 wherein said material of said tube is a plastic.

13. A line shield for a sinker line that attaches to a sinker, the line shield comprising:

a resilient tube having a tube passage through which the sinker line can freely pass, said tube terminating in a tube leading end and a tube trailing end, said tube trailing end further comprises:

a trailing end ledge facing toward said tube leading end; and a hood of resilient material having a hood passage therethrough which is configured to frictionally connect to the sinker and cover the attachment of the sinker line to the sinker, said hood further comprises:

at least one rearward-facing ledge formed by at least one cutout in said hood, said at least one cutout extending through the hood transverse to a longitudinal axis of said hood, said at least one cutout communicating with said hood passage at an inner end thereof and with an exterior of said hood at an exterior end thereof, said at least one cutout configured to be positively engaged by said trailing end ledge of said tube when said tube trailing end is inserted into said hood passage and said trailing end ledge extends into said at least one cutout and engages said at least one rearward-facing ledge; and said tube trailing end further comprises a tapered guide portion that facilitates insertion of said tube trailing end into said hood, said hood passage and said tube trailing end being configured to frictionally engage together when said tube trailing end is inserted into said hood passage so as to maintain said tube trailing end in close proximity to the sinker to allow said tube to guide the sinker over obstructions.

14. The line shield of claim 13 wherein said hood further comprises:

at least one forward-facing ledge communicating with said hood passage and configured to frictionally engage a portion of the sinker.

15. The line shield of claim 14 wherein said at least one forward-facing ledge is formed by said at least one cutout in said hood.

16. The line shield of claim 14 wherein said at least one cutout further comprises:

a trailing pair of cutouts which provide said at least one forward-facing ledge.

* * * * *